(12) United States Patent
Okamura

(10) Patent No.: US 10,636,189 B2
(45) Date of Patent: Apr. 28, 2020

(54) IMAGE EDITING SYSTEM, IMAGE EDITING DEVICE, IMAGE EDITING METHOD, AND IMAGE EDITING PROGRAM

(71) Applicant: FUJIFILM CORPORATION, Minato-ku, Tokyo (JP)

(72) Inventor: Kouki Okamura, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 148 days.

(21) Appl. No.: 15/939,309

(22) Filed: Mar. 29, 2018

(65) Prior Publication Data

US 2018/0218529 A1    Aug. 2, 2018

Related U.S. Application Data

(63) Continuation of application No. PCT/JP2016/079187, filed on Sep. 30, 2016.

(30) Foreign Application Priority Data

Oct. 1, 2015 (JP) ................. 2015-196183

(51) Int. Cl.
*G06T 11/60* (2006.01)
*G06K 9/62* (2006.01)

(52) U.S. Cl.
CPC ............ *G06T 11/60* (2013.01); *G06K 9/6215* (2013.01); *G06T 2200/24* (2013.01)

(58) Field of Classification Search
CPC .... G06T 11/60; G06T 2200/24; G06K 9/6215
See application file for complete search history.

(56) References Cited

U.S. PATENT DOCUMENTS

2014/0013213 A1* 1/2014 Kajiwara .............. G06F 17/212
715/243

FOREIGN PATENT DOCUMENTS

| JP | H11-185063 A | 7/1999 |
| JP | 2007-193580 A | 8/2007 |
| JP | 2009-282881 A | 12/2009 |

(Continued)

OTHER PUBLICATIONS

International Search Report issued in International Application No. PCT/JP2016/079187 dated Oct. 25, 2016.

(Continued)

*Primary Examiner* — Leon Flores
(74) *Attorney, Agent, or Firm* — Solaris Intellectual Property Group, PLLC

(57) ABSTRACT

In an image editing system, an album creation device includes a reception unit that receives a plurality of images from a user and an image analysis unit that analyzes characteristics of the plurality of images. An analysis device includes a leaving determination rule setting unit for which an initial determination rule for determining a degree of possibility that the user is to leave an editing operation of the user using the plurality of images received by the reception unit of the album creation device is set and a leaving prediction unit that predicts the degree of possibility of leaving from a determination result acquired by applying an analysis result of the image analysis unit to the initial determination rule.

12 Claims, 15 Drawing Sheets

(56) References Cited

FOREIGN PATENT DOCUMENTS

| | | |
|---|---|---|
| JP | 2012-147300 A | 8/2012 |
| JP | 2014-59647 A | 4/2014 |

OTHER PUBLICATIONS

Written Opinion of the ISA issued in International Application No. PCT/JP2016/079187 dated Oct. 25, 2016.
English language translation of the following: Office action dated Oct. 2, 2018 from the JPO in a Japanese patent application No. 2017-543667 corresponding to the instant patent application.

* cited by examiner

| USER ID | IMAGE ANALYSIS INFORMATION | OPERATION HISTORY | ORDER/ LEAVING |
|---|---|---|---|
| 100000 | SIMILAR IMAGE RATIO, ⋯ | EDITING TIME, ⋯ | ORDER |
| 100001 | SIMILAR IMAGE RATIO, ⋯ | EDITING TIME, ⋯ | LEAVING |
| ⋯ | ⋯ | ⋯ | ⋯ |

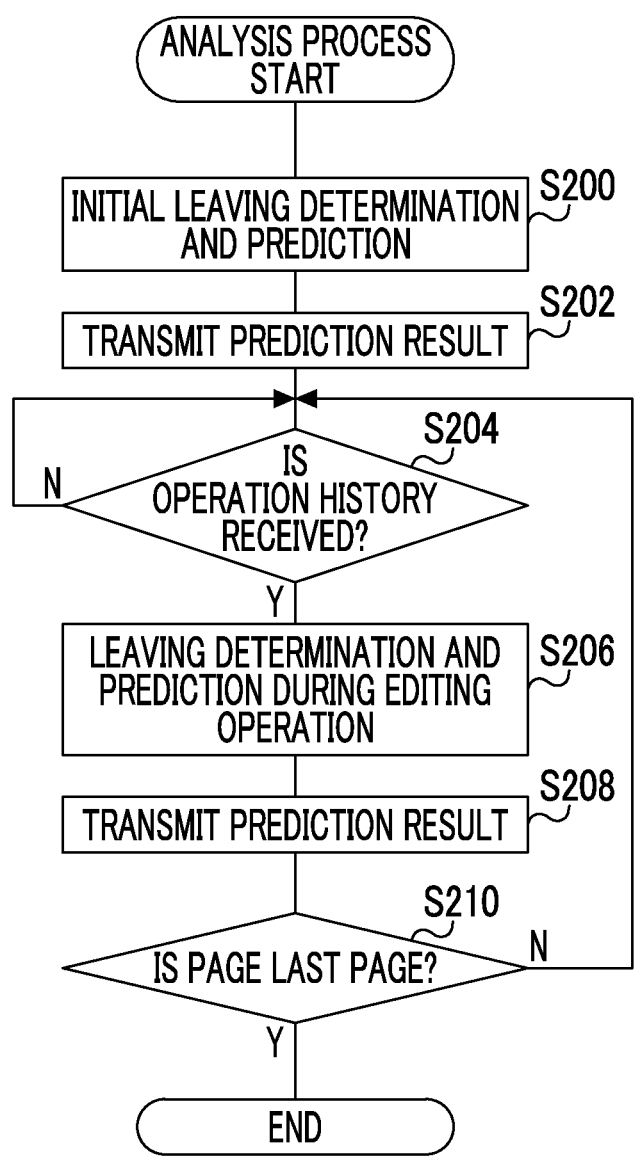

IN-OPERATION DETERMINATION RULE $P = 1/\{1 + \exp(-Z)\}$
$Z = \beta_0 + \beta_1 x_1 + \beta_2 x_2$
$x_1$: TOTAL EDITING TIME
$x_2$: (EDITING TIME OF INITIALLY EDITED PAGE)
    − (EDITING TIME OF PAGE EDITED LAST)

IN-OPERATION DETERMINATION RULE $P = 1/\{1 + \exp(-Z_m)\}$
$Z_m = \beta_{m0} + \beta_{m1}x_1 + \beta_{m2}x_2$
$x_1$ : TOTAL EDITING TIME
$x_2$ : (EDITING TIME OF INITIALLY EDITED PAGE)
   − (EDITING TIME OF PAGE EDITED LAST)

IMAGE EDITING SYSTEM, IMAGE EDITING DEVICE, IMAGE EDITING METHOD, AND IMAGE EDITING PROGRAM

CROSS-REFERENCE TO RELATED APPLICATION

This application is a continuation application of International Application No. PCT/JP2016/079187 filed Sep. 30, 2016, the disclosure of which is incorporated herein by reference in its entirety. Further, this application claims priority from Japanese Patent Application No. 2015-196183 filed Oct. 1, 2015, the disclosure of which is incorporated herein by reference in its entirety.

BACKGROUND OF THE INVENTION

1. Field of the Invention

A technology of the present disclosure relates to an image editing system, an image editing device, an image editing method, and an image editing program.

2. Description of the Related Art

In general, images such as photos, illustrations, and paintings are edited, and an album or a calendar is created. There is a service for ordering an album or a calendar created by a user who performs an editing operation of the images on a terminal device.

In general, it takes a lot of time to perform the editing operation for creating the album or the calendar. Unlike a case where the user performs the editing operation at home, the user may continue the operation without taking a break in a case where the user performs the editing operation on the terminal device installed in a store such as a home electronics retail store or a camera store. In this case, the user may stop the editing operation in the middle of editing the album due to the decline in motivation of the user or time constraints, and may leave the editing operation.

In a case where the user stops and leaves the editing operation, the editing operation is not finished, and thus, the user may not order the album or the calendar. Thus, a technology for performing the editing operation on another day even in a case where the user stops the editing operation is known.

For example, JP2012-147300A and JP2007-193580A describe technologies that save order information in a case where a processing order such as printing of image data on a photo print is received and the order operation of the user is stopped, and call the order information and resume the order in a case where an order operation of the user is resumed.

SUMMARY OF THE INVENTION

However, in the technologies described in JP2012-147300A and JP2007-193580A, the user merely resumes the order operation from the stopped editing operation in a case where the user resumes the editing operation after stopping the editing operation.

Thus, there is no description of a technology that predicts a possibility that the user is to leave the editing operation and performs the editing operation.

A technology of the present disclosure provides an image editing system, an image editing device, an image editing method, and an image editing program capable of increasing a possibility that a user is to finish an editing operation using a plurality of images.

An image editing system of a first aspect of the present invention comprises an image reception unit that receives a plurality of images from a user, a setting unit for which an initial determination rule for determining a degree of possibility that the user is to leave an editing operation of the user using the plurality of images received by the image reception unit is set, an analysis unit that analyzes characteristics of the plurality of images, and a prediction unit that predicts the degree of possibility of leaving from a determination result acquired by applying an analysis result of the analysis unit to the initial determination rule.

According to an image editing system of a second aspect of the present invention, in the image editing system of the first aspect, in a case where the predicted degree of possibility of leaving is greater than a predetermined threshold, the prediction unit may determine that the possibility of leaving is high.

In the image editing system of the second aspect, an image editing system of a third aspect of the present invention may further comprise a leaving suppression unit that displays predetermined display for suppressing the leaving or for causing the user to perform the editing operation again after the user leaves on a display unit in a case where the prediction unit determines that the possibility of leaving is high.

According to an image editing system of a fourth aspect of the present invention, in the image editing system of the third aspect, the leaving suppression unit may perform the predetermined display in at least one of a time before the editing operation is started or a time within a predetermined time after the editing operation is started.

In the image editing system of any one aspect of the second to fourth aspects, an image editing system of a fifth aspect of the present invention may further comprise a monitoring unit that monitors the editing operation of the user in a case where the prediction unit determines that the possibility of leaving is high. The prediction unit may predict the degree of possibility of leaving from a determination result acquired by applying a monitoring result of the monitoring unit to an in-operation determination rule for determining the degree of possibility of leaving during the editing operation based on past data.

According to an image editing system of a sixth aspect of the present invention, in the image editing system of the fifth aspect, the in-operation determination rule may be set based on a time elapsed after the user starts the editing operation and a change amount of an editing time when the user performs the editing operation on mountboards to which the plurality of images is assigned and on which the editing operation is performed.

According to an image editing system of a seventh aspect of the present invention, in the image editing system of any one aspect of the first to sixth aspects, the initial determination rule may be set for the setting unit based on a relationship between information regarding editing operations performed by a plurality of users and information indicating whether or not the users leave the editing operations.

According to an image editing system of an eighth aspect of the present invention, in the image editing system of the sixth aspect, the information regarding the editing operations may be at least one of a ratio of the number of a plurality of similar images to the number of the plurality of images, the number of the plurality of images, or the number of mountboards to which the plurality of images is assigned and on which the editing operation is performed.

In the image editing system of any one aspect of the first to eighth aspects, an image editing system of a ninth aspect of the present invention may further comprise a reproduction unit that saves a content of the editing operation before the user leaves the editing operation in a case where the user leaves the editing operation, and reproduces the saved content of the editing operation in a case where an instruction to resume the editing operation is received after the user leaves.

In the image editing system of any one aspect of the first to ninth aspects, an image editing system of a tenth aspect of the present invention may further comprise a providing unit that provides information indicating the user is able to receive a predetermined service by resuming the editing operation after the user leaves to the user in a case where the user leaves the editing operation.

An image editing device of an eleventh aspect of the present invention comprises an image reception unit that receives a plurality of images from a user, an analysis unit that analyzes characteristics of the plurality of images, and a leaving suppression unit that predicts a degree of possibility of leaving that the user is to leave the editing operation of the user using the plurality of images received by the image reception unit from a determination result acquired by applying an analysis result of the analysis unit to an initial determination rule for determining the degree of possibility of leaving, and displays predetermined display for suppressing the leaving or for causing the user to perform the editing operation again after the user leaves on a display unit in a case where a prediction unit of an analysis device determines that the possibility of leaving is high. The prediction unit determines that the possibility of leaving is high in a case where the predicted degree of possibility of leaving is greater than a predetermined threshold.

An image editing method of a twelfth aspect of the present invention comprises receiving a plurality of images from a user, setting an initial determination rule for determining a degree of possibility that the user is to leave an editing operation of the user using the plurality of received images, analyzing characteristics of the plurality of images, and predicting the degree of possibility of leaving from a determination result acquired by applying a result of the analysis to the initial determination rule.

An image editing program of a thirteenth aspect of the present invention causing a computer to function as the image editing system of the present invention.

According to an embodiment of the present invention, it is possible to provide an image editing system, an image editing device, an image editing method, and an image editing program capable of increasing a possibility that a user is to finish an editing operation using a plurality of images.

BRIEF DESCRIPTION OF THE DRAWINGS

FIG. 8 is a flowchart showing an example of a flow of an analysis process performed by the analysis device of the present embodiment.

DESCRIPTION OF THE PREFERRED EMBODIMENTS

Hereinafter, an embodiment of a technology of the present disclosure will be described in detail with reference to the drawings. The present embodiment is not intended to limit the present invention.

Figure 1:
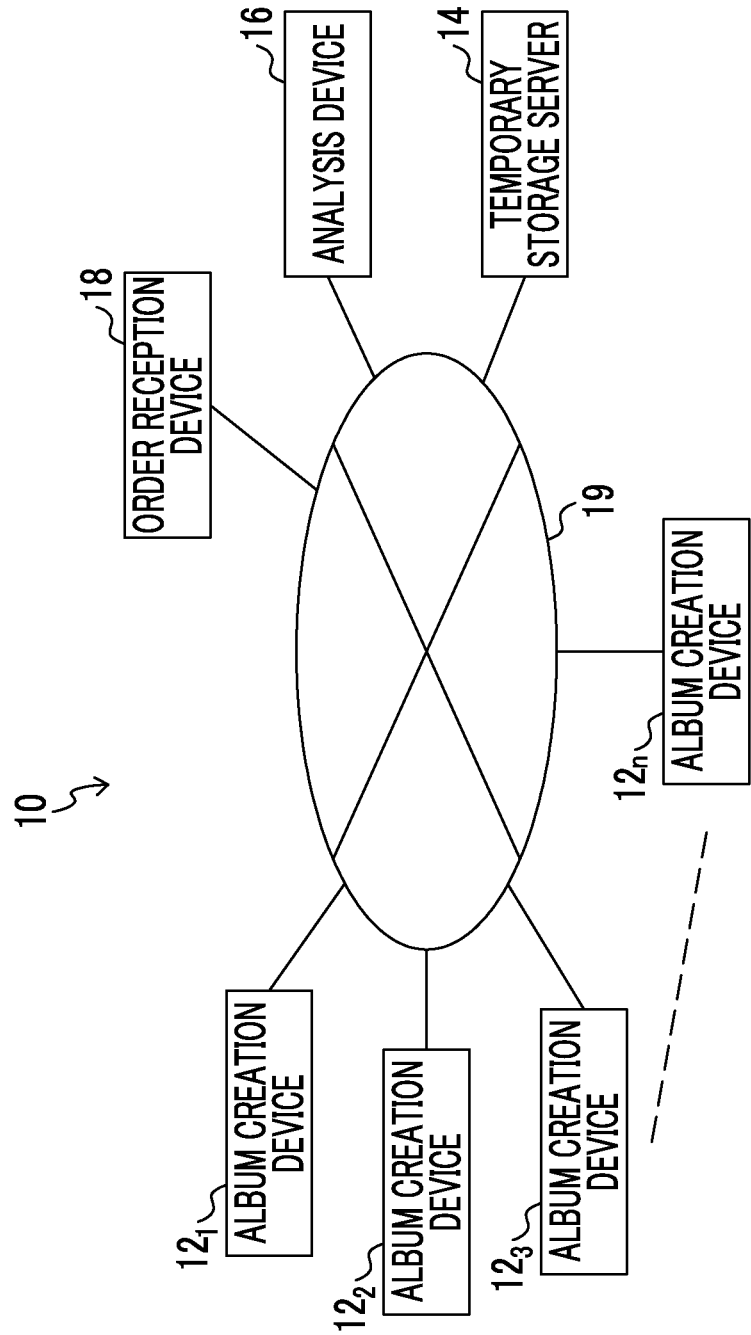
FIG. 1 is a block diagram showing an overall configuration example of an image editing system of the present embodiment.

Initially, a configuration of an image editing system 10 of the present embodiment will be described. As shown in FIG. 1, the image editing system 10 of the present embodiment includes n number of album creation devices 12 (album creation devices $12_1$ to $12_n$), a temporary storage server 14, an analysis device 16, and an order reception device 18. Hereinafter, the album creating devices $12_1$ to $12_n$ are collectively referred to as the "album creation devices 12" in a case where it is not necessary to particularly distinguish between the album creation devices. The number (n) of album creation devices 12 included in the image editing system 10 is not particularly limited, and may be one or more.

The album creation devices 12, the temporary storage server 14, the analysis device 16, and the order reception device 18 are connected via a network 19 so as to transmit and receive various data items.

The image editing system 10 of the present embodiment edits a photographic image captured by a digital camera or a smartphone of a user, and creates an actual album called a so-called photo-album or a photo-book.

The album creation device 12 is a device by which a user performs an editing operation in order to create an album. As a specific example, the album creation device 12 of the present embodiment is a device installed in a store such as a home electronics retail store or a camera store. Thus, in the image editing system 10 of the present embodiment, in a case where the album is created, the user goes to the store, and inputs image data items of photos to the album creation device 12, and performs the editing operation by using the input image data items. In the present embodiment, the operation performed on the album creation device 12 by the user in order to create the album is referred to as the "editing operation".

As the editing operation performed on the album creation device 12 of the present embodiment, there are multiple kinds of operations. Examples of the kind of the editing operation include operations for respectively selecting an album size, a front cover, a mountboard, the number of mountboards (hereinafter, referred to as the number of pages"), a predetermined template, and a photo to be arranged in each page (including addition, removal, and replacement). Examples of the kind of the editing operation include a processing operation such as an operation for determining a photo size, an operation for determining a photo arrangement position, an operation for trimming a photo, and an operation for adjusting color. Examples of the kind of the editing operation include a decoration operation using a stamp or comment insertion for finishing a page of choice.

The order reception device 18 receives an order of an actual album created by the editing operation of the user from the user who performs the editing operation on the album by using the album creation device 12. In the image editing system 10 of the present embodiment, in a case where the order reception device 18 receives the order, various processes such as a process for printing the photos on the mountboards or a process for bookbinding the mountboards are performed according to the editing operation performed by the user by using the album creation device 12, and the created actual album is delivered to the user by mail.

In a case where the user temporarily stops the editing operation using the album creation device 12, the temporary storage server 14 temporarily saves the contents of the editing operation.

The analysis device 16 analyzes a degree of possibility that the user is to leave the editing operation based on an image analysis result acquired by analyzing the photographic images and a history (hereinafter, referred to as an "operation history") of the editing operations performed by the user using the album creation device 12. The "leaving" in the present embodiment means that the user stops the editing operation in the middle of editing the album. Thereafter, even though the editing operation is temporarily stopped as in a case where the user resumes the editing operation and finally orders the album, a case where the editing operation is stopped in the album creation device 12 is regarded as "leaving".

The image editing system 10 of the present embodiment performs a process for causing the user to finish the editing operation based on the degree of possibility that the user who performs the editing operation by using the album creation device 12 is to leave the editing operation. The configuration of the image editing system 10 for performing the process will be described.

Figure 2:
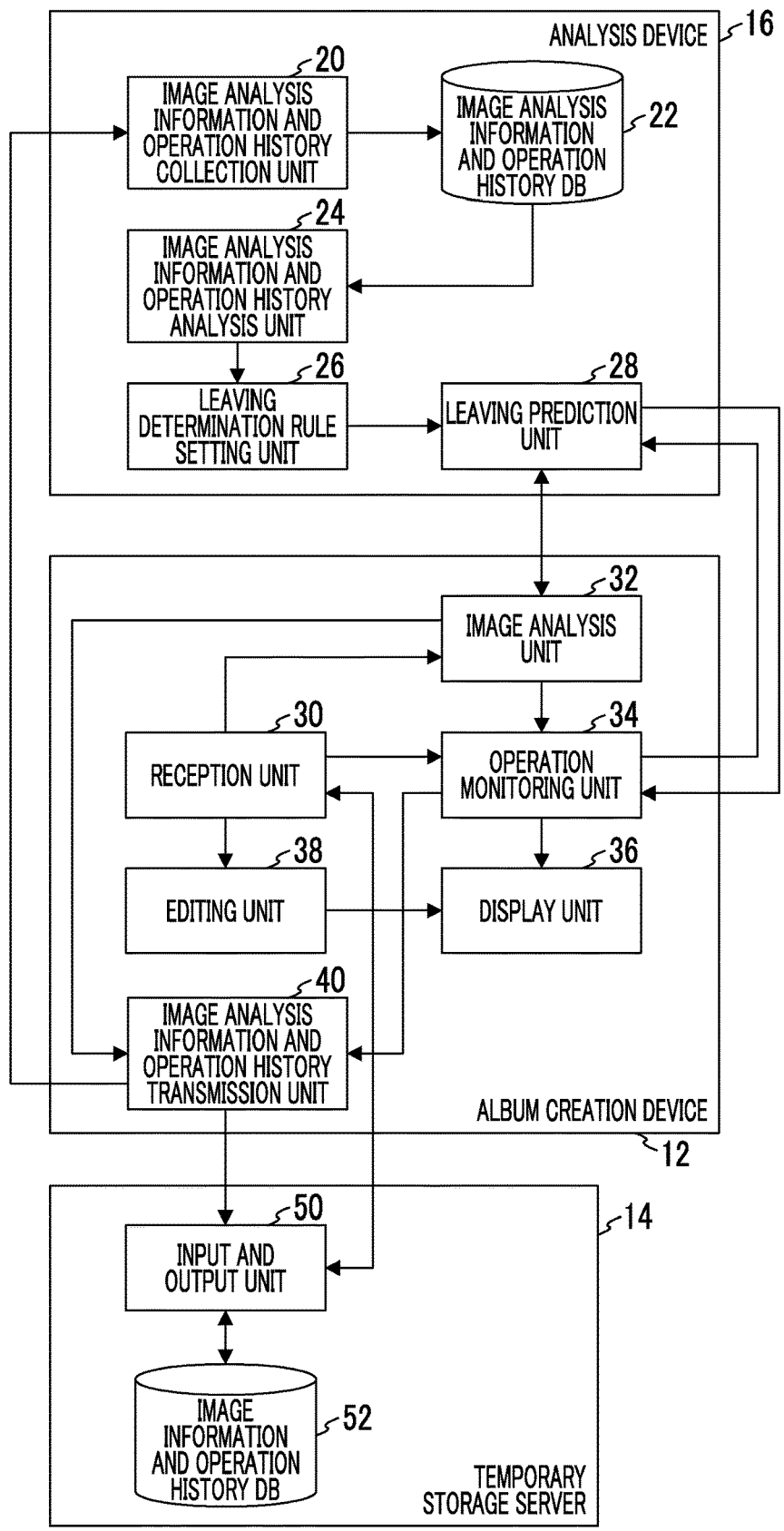
FIG. 2 is a block diagram showing a functional configuration example of the image editing system of the present embodiment.

As shown in FIG. 2, the album creation device 12 of the present embodiment includes a reception unit 30, an image analysis unit 32, an operation monitoring unit 34, a display unit 36, an editing unit 38, and an image analysis information and operation history transmission unit 40.

The reception unit 30 receives an input of image data items (hereinafter, simply referred to as "image data items") representing a plurality of photographic images from the user. The image data items received by the reception unit 30 is temporarily stored in a storage unit 66, to be described below, shown in FIG. 4. The reception unit 30 outputs the received image data items to the image analysis unit 32. The reception unit 30 of the present embodiment is an example of an image reception unit of the technology of the present disclosure.

The reception unit 30 receives the editing operation performed on the album creation device 12 by the user.

The editing unit 38 performs the process corresponding to the editing operation received by the reception unit 30. A processing result which is a result of the editing operation is output to the display unit 36. The "display" in the present embodiment includes audible indication using an audio reproduction device such as a speaker and permanent visible display using an image forming device such as a printer in addition to visible display using a display device such as a display. In the present embodiment, as a specific example, the processing result of the editing unit 38 is displayed on the display unit 36 which is the display device such as the display. The display unit 36 of the present embodiment is an example of a providing unit and a display unit of the technology of the present disclosure.

The image analysis unit 32 of the album creation device 12 outputs, as image analysis information, the result acquired by analyzing the image indicated by the image data items input by the user, as information for analyzing the relationship between an attribute value of the images represented by the image data items influencing the leaving and the leaving. The image analysis unit 32 of the present embodiment is an example of an analysis unit of the technology of the present disclosure.

In general, in a case where there are many images of which compositions are similar to one another, it tends to take time for the user to select a best image among the images. Thus, as a specific example, the image analysis unit 32 of the present embodiment calculates a similar image ratio between the plurality of images received by the reception unit 30, and outputs the similar image ratio as the image analysis result. The "similar image ratio" in the present embodiment is a ratio of the number of similar images to the number of all images. The image analysis unit 32 of the present embodiment determines that the images are similar to one another in a case where a capturing time interval falls within a predetermined range and the compositions are similar to one another. The images similar to one another are assigned the same identification (ID) indicating that the images belong to the same group. The method of determining whether or not the compositions of the images are similar is not particularly limited. For example, a method of determining that images of which feature amounts extracted from the images fall within a predetermined range in which the images are regarded as being similar are similar images is used.

In general, in a case where the user inputs a relatively large number of images to the album creation device 12, since the user selects the images to be used in the album among the images, it tends to take a lot of time to perform the editing operation for creating the album. Thus, the image analysis unit 32 of the present embodiment calculates the number of images received by the reception unit 30, specifically, the number of images per page of the album. More specifically, the image analysis unit calculates a value acquired by dividing the number of all images received by the reception unit 30 by the number of pages, as the number of images.

The analysis result of the image analysis unit 32 is transmitted to a leaving prediction unit 28 of the analysis device 16 and the operation monitoring unit 34. The analysis result is temporarily stored as the image analysis information in the storage unit 66, to be described below, shown in FIG. 4.

The operation monitoring unit 34 outputs operation history information indicating an operation history of the editing operations of the user received by the reception unit 30 to the image analysis information and operation history transmission unit 40. As a specific example of the operation history information of the present embodiment, information indicating the kind of the editing operation performed by the user or a time (hereinafter, referred to as an "editing time") spent on the editing operation is used. In general, as a time elapsed after the user starts the editing operation becomes longer, it tends to increase a possibility that the user is to leave the editing operation. Thus, the operation monitoring unit 34 of the present embodiment manages the information regarding the editing time as the operation history information. The operation history information is temporarily stored in the storage unit 66, to be described below, shown in FIG. 4.

In a case where the leaving prediction unit 28 of the analysis device 16 predicts that a possibility that the user who starts the editing operation is to leave the editing operation is to be high, the operation monitoring unit 34 monitors the editing operation of the user received by the reception unit 30. The monitoring result of the operation monitoring unit 34 is transmitted to the leaving prediction unit 28.

The operation monitoring unit 34 of the present embodiment is an example of a leaving suppression unit and a monitoring unit of the technology of the present disclosure.

Figures 3, 4:
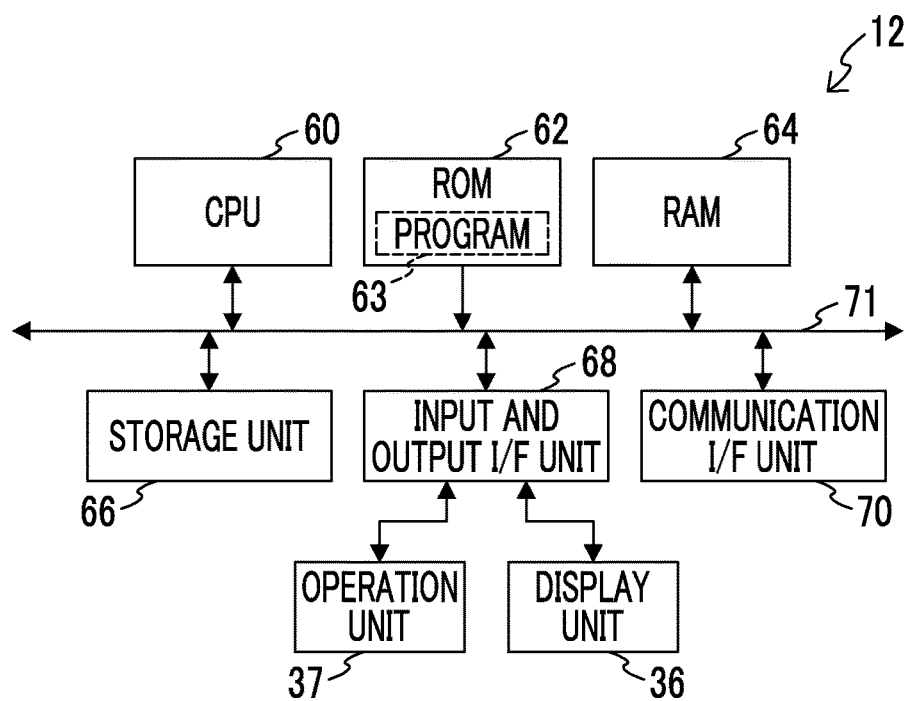
FIG. 3 is a diagram showing an example of an image analysis information and operation history database of the present embodiment.
FIG. 4 is a block diagram showing an example of a configuration of main components in the hardware of an album creation device of the present embodiment.

The image analysis information and operation history transmission unit 40 transmits the image analysis information and the operation history information to an image analysis information and operation history collection unit 20. In a case where the order of the album is performed as a result of the editing operation performed by the user, the image analysis information and operation history transmission unit 40 of the present embodiment transmits the image analysis information and the operation history information together with the information regarding the order to the image analysis information and operation history collection unit 20 of the analysis device 16. In a case where the user leaves the editing operation, the image analysis information and the operation history information stored in the storage unit 66, to be described below, shown in FIG. 4 are transmitted to the image analysis information and operation history collection unit 20 of the analysis device 16 at a predetermined timing (for example, once a day).

Meanwhile, the analysis device 16 includes the image analysis information and operation history collection unit 20, an image analysis information and operation history database (DB) 22, an image analysis information and operation history analysis unit 24, a leaving determination rule setting unit 26, and the leaving prediction unit 28.

The image analysis information and operation history collection unit 20 collects the image analysis information and the operation history information from the album creation device 12. The image analysis information and the operation history information collected by the image analysis information and operation history collection unit 20 is accumulated as the image analysis information and operation history DB 22. For example, as shown in FIG. 3, the image analysis information and operation history DB 22 is a database representing a correspondence between an ID, the image analysis information, the operation history information, and the information indicating whether the user orders the album or leaves the editing operation. The ID in the image analysis information and operation history DB 22 shown in FIG. 3 is not particularly limited, and information for identifying the user who performs the editing operation is used as the ID.

The image analysis information and operation history analysis unit 24 analyzes the information included in the image analysis information and operation history DB 22, and determines an initial determination rule and an in-operation determination rule (to be described below in detail) based on the analysis result.

The initial determination rule and the in-operation determination rule determined by the image analysis information and operation history analysis unit 24 are set for the leaving determination rule setting unit 26. The leaving determination rule setting unit 26 of the present embodiment is an example of a setting unit of the technology of the present disclosure.

The leaving prediction unit 28 predicts the degree of possibility of leaving of the user from the determination result acquired by applying the image analysis result of the image analysis unit 32 to the initial determination rule set for the leaving determination rule setting unit 26 and the determination result acquired by applying the monitoring result of the operation monitoring unit 34 to the in-operation determination rule. The leaving prediction unit 28 of the present embodiment is an example of a prediction unit of the technology of the present disclosure.

Meanwhile, the temporary storage server 14 includes an input and output unit 50 and an image information and operation history DB 52.

In a case where the user temporarily saves editing operation content and leaves the editing operation, the image information and the operation history information which are the information regarding the image data items are input to the input and output unit 50 from the album creation device 12. Specifically, the image data items received by the reception unit 30 are input as the image information to the input and output unit 50. The kind of the editing operation performed by the user is input as the operation history information to the input and output unit 50 from the image analysis information and operation history transmission unit 40 of the album creation device 12 until the user leaves the editing operation. The image information and the operation history information input to the input and output unit 50 are accumulated as the image information and operation history DB 52.

The image information and operation history DB 52 of the present embodiment is a database representing a correspondence between a user ID which is information for identifying the user who performs the editing operation, an image ID which is information for identifying the image as a target of the editing operation, the operation history information, and an operation date and time. The image information and operation history DB 52 is not limited thereto. For example, the image data items (image files) which are the targets of the editing operation performed by the user may be included as the image information.

In a case where the user resumes the editing operation after leaving the editing operation in the album creation device 12, the input and output unit 50 reads out the image information and the operation history corresponding to the editing operation performed until a previous time from the image information and operation history DB 52, and transmits the readout image information and operation history to the reception unit 30 of the album creation device 12.

In a case where the image information and the operation history information included in the image information and operation history DB 52 are not read even after a predetermined period elapses after the image information and the operation history information are accumulated in the image information and operation history DB 52, that is, in a case where the editing operation is not resumed by the user even after the predetermined period elapses, the image information and the operation history information are discarded.

Hereinafter, the configuration of main components in the hardware of the album creation device 12, the temporary storage server 14, and the analysis device 16 of the present embodiment will be described.

As shown in FIG. 4, the album creation device 12 of the present embodiment includes a central processing unit (CPU) 60, a read only memory (ROM) 62, a random access memory (RAM) 64, the storage unit 66, an input and output interface (I/F) unit 68, and a communication I/F unit 70. The CPU 60, the ROM 62, the RAM 64, the storage unit 66, the input and output I/F unit 68, and the communication I/F unit 70 are connected to one another through a bus 71 so as to transmit and receive data.

The CPU 60 controls the overall operation of the album creation device 12. The ROM 62 stores various parameters or various programs in advance including a program 63 for performing an album creation process to be described below. The RAM 64 is used as a work area in a case where the CPU 60 executes various programs. The storage unit 66 is a non-volatile storage unit such as a flash memory.

As shown in FIG. 4, the display unit 36 is connected to the input and output I/F unit 68. As shown in FIG. 4, an operation unit 37 such as a mouse, a touch pen, or a keyboard to be used in a case where the user performs the editing operation is connected to the input and output I/F unit 68. The communication I/F unit 70 is connected to one another to the network 19.

Figure 5:
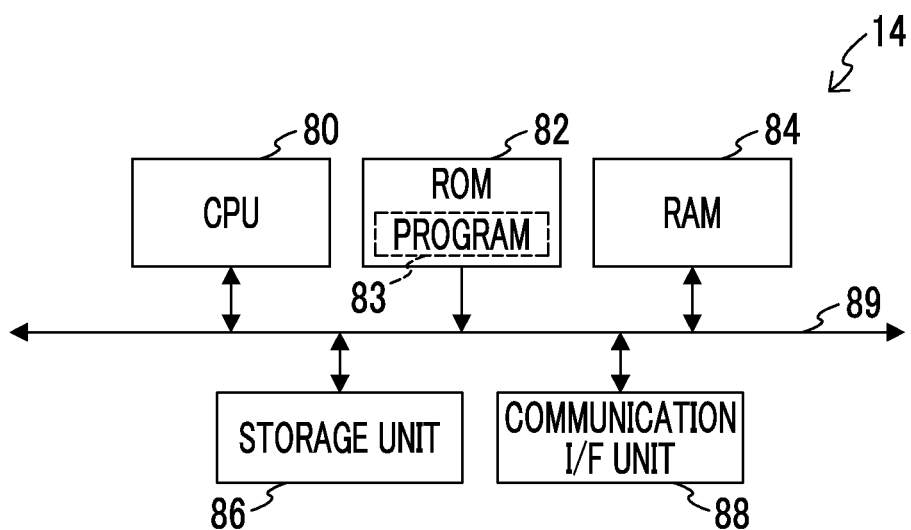
FIG. 5 is a block diagram showing an example of a configuration of main components in the hardware of a temporary storage server of the present embodiment.

Meanwhile, as shown in FIG. 5, the temporary storage server 14 of the present embodiment includes a CPU 80, a ROM 82, a RAM 84, a storage unit 86, and a communication I/F unit 88. The CPU 80, the ROM 82, the RAM 84, the storage unit 86, and the communication I/F unit 88 are connected through a bus 89 so as to transmit and receive data.

The CPU 80 controls the overall operation of the temporary storage server 14. The ROM 82 stores various parameters or various programs in advance including a program 83 for performing an information searching process to be described. The RAM 84 is used as a work area in a case where the CPU 80 executes various programs. The storage unit 86 is a non-volatile storage unit such as a flash memory. The image information and operation history DB 52 is stored in the storage unit 86 of the present embodiment. The communication I/F unit 88 is connected to the network 19.

Figure 6:
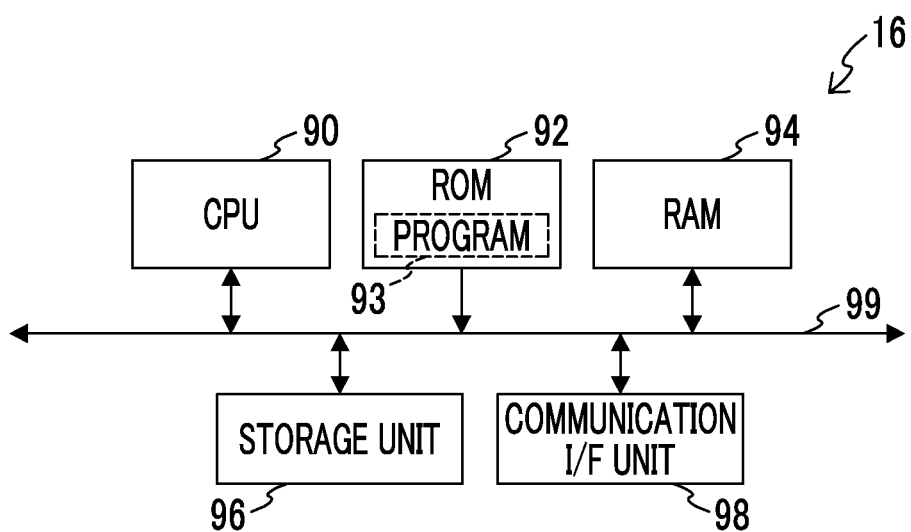
FIG. 6 is a block diagram showing an example of a configuration of main components in the hardware of an analysis device of the present embodiment.

As shown in FIG. 6, the analysis device 16 of the present embodiment includes a CPU 90, a ROM 92, a RAM 94, a storage unit 96, and a communication I/F unit 98. The CPU 90, the ROM 92, the RAM 94, the storage unit 96, and the communication I/F unit 98 are connected to one another through a bus 99 so as to transmit and receive data.

The CPU 90 controls the overall operation of the analysis device 16. The ROM 92 stores various parameters or various programs in advance including a program 93 for performing an analysis process to be described. The RAM 94 is used as a work area in a case where the CPU 90 executes various programs. The storage unit 96 is a non-volatile storage unit such as a flash memory. The image analysis information and operation history DB 22 is stored in the storage unit 96 of the present embodiment. The communication I/F unit 98 is connected to the network 19.

Hereinafter, an action of the image editing system 10 of the present embodiment will be described with reference to FIGS. 7A, 7B, and 8.

Figure 7A:
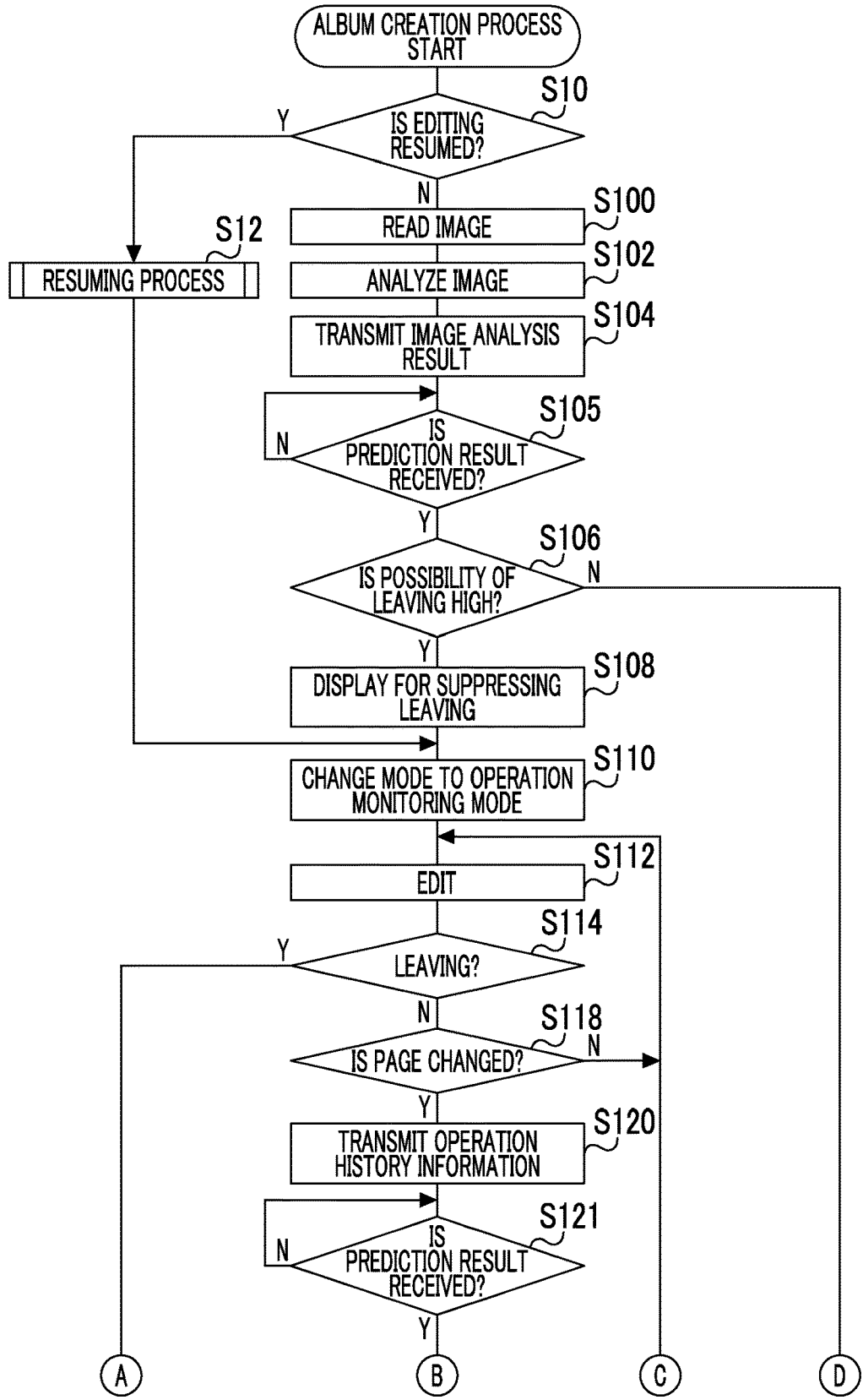
FIGS. 7A and 7B are a flowchart showing an example of a flow of an album creation process performed by the album creation device of the present embodiment.
Figure 7B:
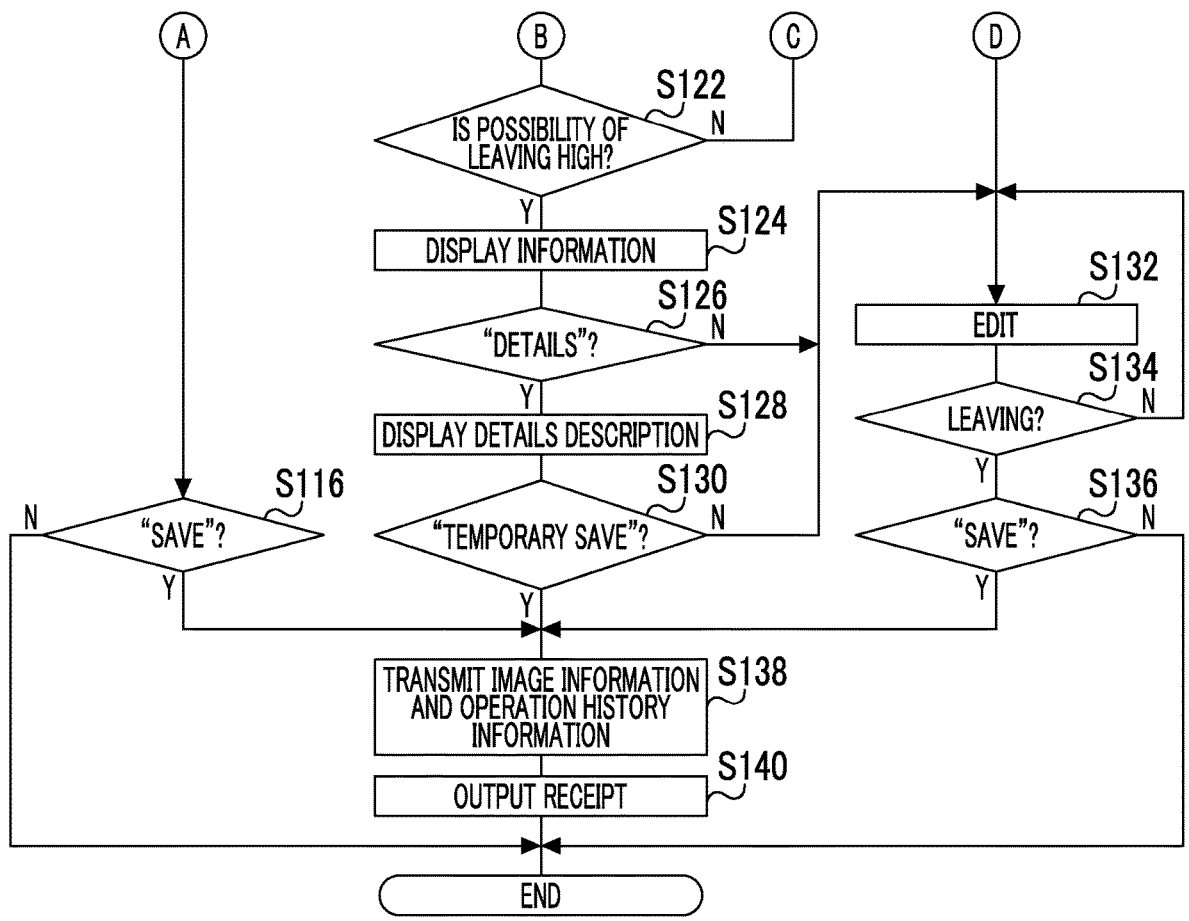

The album creation process shown in FIGS. 7A and 7B is a process for causing the user to finish the editing operation based on the degree of possibility that the user who performs the editing operation is to leave the editing operation. In a case where the reception unit 30 of the album creation device 12 receives an instruction to create the album from the user, the album creation process shown in FIGS. 7A and 7B is performed by the CPU 60. In the album creation device 12 of the present embodiment, the user instructs new creation of an album or resuming of the editing operation after leaving the editing operation by using the operation unit 37 (see FIG. 4).

In step S10, the reception unit 30 determines whether or not the instruction performed by the user by using the operation unit 37 indicates that the user resumes the editing operation after leaving the editing operation. In a case where the instruction indicates that the user newly creates the album, the determination result is negative, and the process proceeds to step S100.

In step S100, the image analysis unit 32 reads the image data items of the photos received by the reception unit 30. In the present embodiment, for example, a method of inserting a media (storage medium) that stores the image data items of the plurality of photos captured by the digital camera into a predetermined insertion port of the album creation device 12 and reading the image data items within the media into the album creation device 12 is used as a method of causing the user to input the image data items of the photos to the album creation device 12. In this case, the image data items of the photos which are not related to the creation of the album may be included in the media. Thus, the reception unit 30 causes the user to select the image data items of the photos to be used for creating the album among the image data items of the photos stored in the media, and receives the image data items of the photos selected by the user. The method of selecting the image data items in this case is not particularly limited. For example, a selection method of selecting all the image data items of the photos captured within the period by specifying capturing dates added to the image data items within a period by the user or a method of selecting the image data items by specifying a folder within the media that stores the image data items of the photos to be selected are used as the selection method.

In next step S102, the image analysis unit 32 analyzes the read image data. Specifically, the similar image ratio and the number of images per page of the album are calculated as described above. In next step S104, the image analysis unit 32 transmits the calculated value, as the image analysis result, to the leaving prediction unit 28 of the analysis device 16.

In a case where the image analysis result is input to the leaving prediction unit 28 from the image analysis unit 32, the analysis process for determining the degree of possibility of leaving of the user who performs the editing operation is performed by the CPU 90 in the analysis device 16. Hereinafter, the analysis process performed in the analysis device 16 of the present embodiment will be described with reference to FIG. 8.

In step S200 of FIG. 8, the leaving prediction unit 28 performs initial leaving determination. The leaving prediction unit 28 performs leaving prediction from the determination result. For example, in the present embodiment, the initial leaving determination is performed by using a definition determination tree determined as the initial determination rule shown in FIG. 9. In the present embodiment, the "initial" means at least a state before the user starts the editing operation performed for each page.

Figure 9:
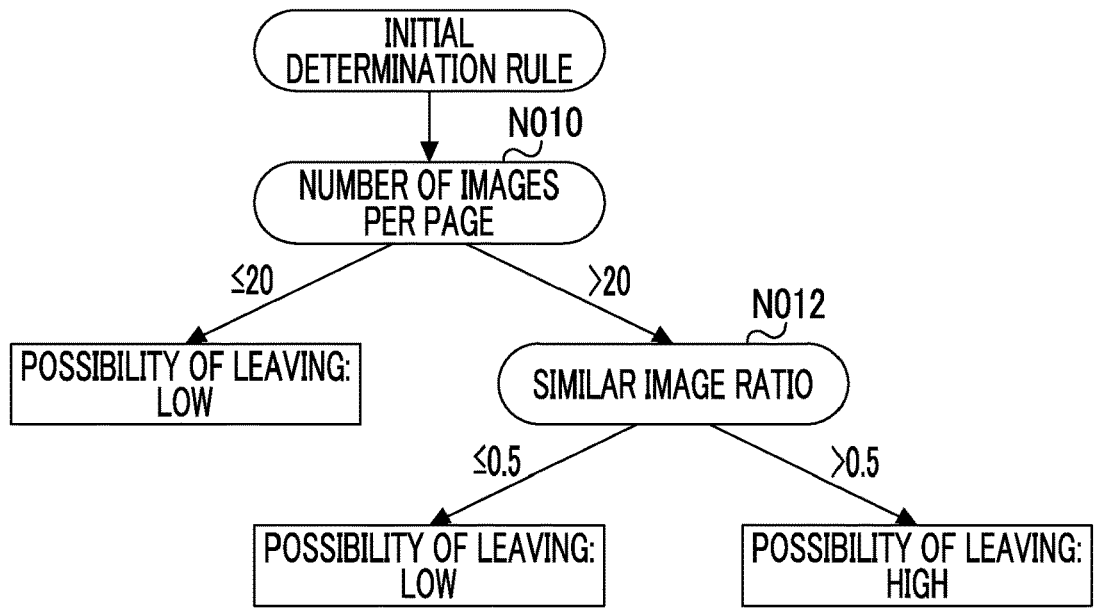
FIG. 9 is a diagram of a determination tree showing an example of an initial determination rule used in a leaving prediction unit of the analysis device of the present embodiment.

In the example shown in FIG. 9, the determination is divided according the number of images per page in node N010. For example, in a case where the number of images per page is equal to or less than 20, the leaving prediction unit 28 determines that the possibility of leaving is low. Meanwhile, in a case where the number of images per page exceeds 20, the determination is divided according to the similar image ratio in node N012. For example, in a case where the similar image ratio is equal to or less than 0.5, that is, in a case where the number of similar images is equal to or less than half the number of all images, the leaving prediction unit 28 determines that the possibility of leaving is low. Meanwhile, for example, in a case where the similar image ratio is greater than 0.5, that is, in a case where the number of similar images exceeds half the number of all images, the leaving prediction unit 28 determines that the possibility of leaving is high.

The leaving prediction unit 28 predicts the degree of possibility of leaving of the user from the determination result acquired by applying the analysis result of the image analysis unit 32 to the initial determination rule in this manner. In the present embodiment, in a case where the determination result indicating that the possibility is high is acquired, the leaving prediction unit predicts that the degree of possibility of leaving is high. In a case where the determination result indicating that the possibility is low is acquired, the leaving prediction unit predicts that the degree of possibility of leaving is low.

In a case where the degree of possibility of leaving is determined, in next step S202, the leaving prediction unit 28 transmits information indicating the prediction result to the operation monitoring unit 34 of the album creation device 12, and the process proceeds to step S204.

In step S204, the leaving prediction unit 28 determines whether or not the operation history information is received from the album creation device 12. In a case where the operation history information is not yet received, the determination result is negative, and the process is in a standby state.

As stated above, since the information indicating the prediction result is transmitted to the album creation device 12 in step S202, the operation monitoring unit 34 determines whether or not the information indicating the prediction result is received in step S105 (see FIGS. 7A and 7B) of the album creation process. In a case where the information indicating the determination result is not yet received, the determination result is negative, and the process is in a standby state. Meanwhile, in a case where the prediction result is received, the determination result is positive, the process proceeds to step S106.

In step S106, the operation monitoring unit 34 determines whether or not the possibility of leaving is high based on the information indicating the received prediction result. In a case where the possibility of leaving is low, the determination result is negative, and the process proceeds to step S132.

In step S132, the editing unit 38 performs a process corresponding to the editing operation of the user. In the present step, the editing unit 38 appropriately performs processes corresponding to the multiple kinds of editing operations performed by the user. In the album creation device 12 of the present embodiment, the user can stop the editing operation and can leave the editing operation during the editing operation. In a case where an instruction indicating that the user wants to stop the editing operation and wants to leave the editing operation is received from the user, the reception unit 30 displays a message for inquiring whether to stop and leave the editing operation on the display unit 36 which is the display device through the operation monitoring unit 34. In the present embodiment, for example, a message 100 of "Information" is displayed on a screen 36A of the display unit 36 as shown in FIG. 10.

Figure 10:
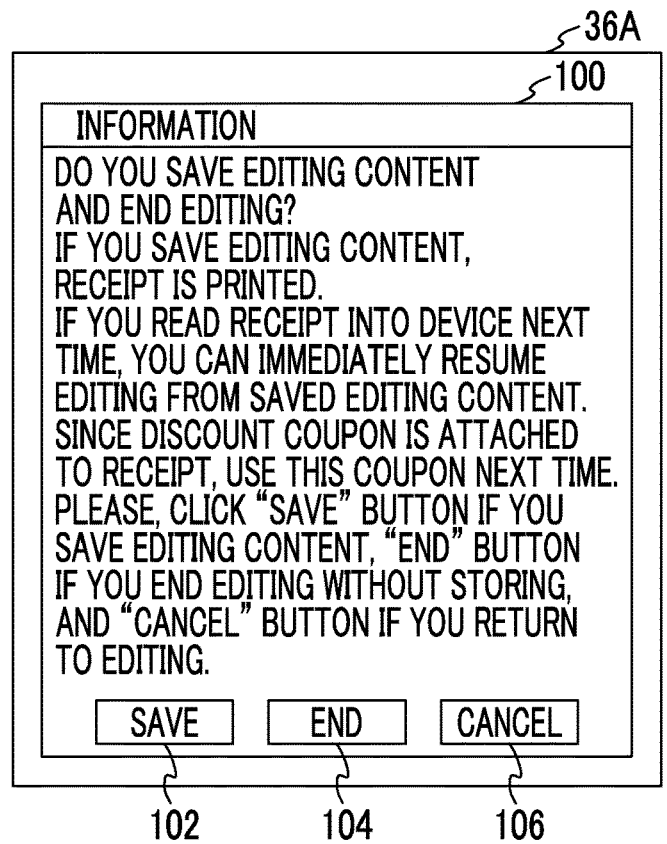
FIG. 10 is a diagram showing a specific example of a message to be displayed on a display unit in a case where a user attempts to stop an editing operation in the album creation device of the present embodiment.

A message for confirming which one any of "Save" indicating that the editing operation is ended after the editing contents are saved, "End" indicating that the editing operation is ended without preserving the editing contents, and "Cancel" indicating that the returning to the editing operation is performed is included in the message 100 shown in FIG. 10. A message indicating that the editing operation is able to be resumed from the saved editing contents on another day in a case where the "Save" is performed or a message indicating that an available discount coupon is given in a case where the editing operation is resumed is included in the message 100.

A save button 102 operated by the click of the user in a case where the user selects the "Save", an end button 104 operated by the user in a case where the user selects the "End", and a cancel button 106 operated by the user in a case where the user selects the "Cancel" are displayed on the screen 36A shown in FIG. 10.

The reception unit 30 determines which one of the save button 102, the end button 104, and the cancel button 106 which is operated by the user, and outputs the determination result to the operation monitoring unit 34.

In step S134, the operation monitoring unit 34 determines whether or not the user leaves the editing operation. Specifically, in a case where the cancel button 106 is operated by the user, the determination result is negative, and the process returns to step S132. Meanwhile, in a case where the save button 102 or the end button 104 is operated by the user, the determination result is positive, and the process proceeds to step S136.

In step S136, the operation monitoring unit 34 determines whether or not the save button 102 is operated by the user. In a case where the save button 102 is operated, the determination result is positive, and the process proceeds to step S138. Meanwhile, in a case where the end button 104 is operated, the determination result is negative, and the present album creation process is ended.

Meanwhile, in a case where the possibility of leaving is high in step S106, the determination result is positive, and the process proceeds to step S108.

Figure 11:
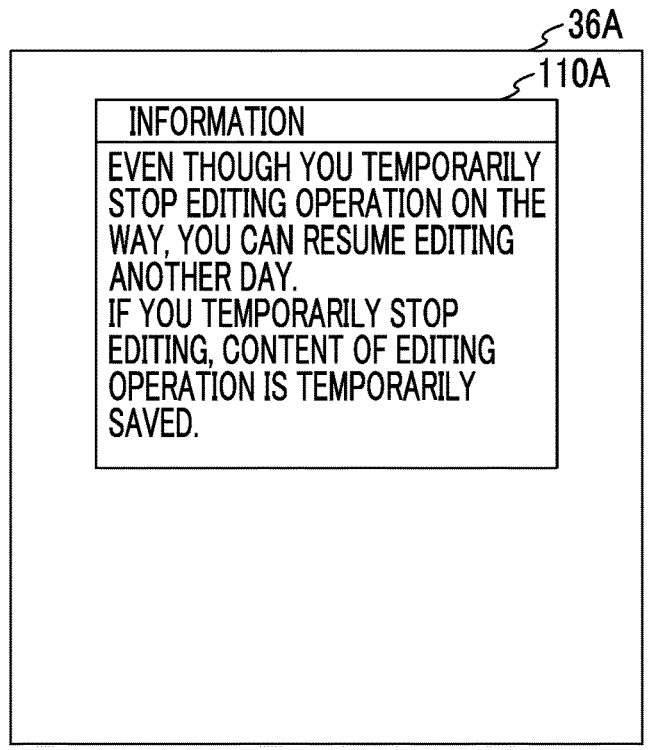
FIG. 11 is a diagram showing a specific example of a display screen for suppressing leaving to be displayed on the display unit in the album creation device of the present embodiment.
Figure 12:
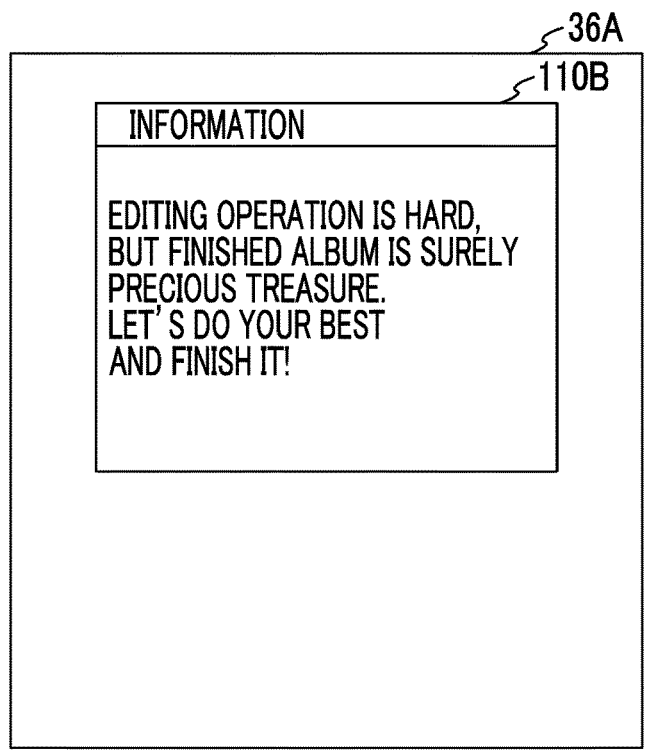
FIG. 12 is a diagram showing another specific example of a display screen for suppressing leaving to be displayed on the display unit in the album creation device of the present embodiment.

In step S108, the operation monitoring unit 34 performs display for suppressing the leaving on the screen 36A of the display unit 36. As long as the display for suppressing the leaving to be displayed is display for suppressing the leaving of the user or finishing the album after resuming the editing operation even though the user leaves the editing operation, the contents thereof are not particularly limited. For example, as shown in FIG. 11, the display for suppressing the leaving may be a message 110A indicating that the editing operation is able to be resumed on another day even though the editing operation is temporarily stopped in the middle of editing the album. For example, as shown in FIG. 12, the display for suppressing the leaving may be a message 110B for supporting the continuation of the editing operation of the user and the finishing of the album.

In next step S110, the operation monitoring unit 34 proceeds to an operation monitoring mode in which the editing operation of the user is monitored.

In next step S112, the editing unit 38 performs the process corresponding to the editing operation of the user similarly to step S132. As described above, in the album creation device 12 of the present embodiment, the user can stop and leave the editing operation during the editing operation. Thus, as described above, in a case where the instruction indicating that the user wants to stop and leave the editing operation is received from the user, the reception unit 30 displays the message (see FIG. 10) for inquiring whether to stop and leave the editing operation on the display unit 36 through the operation monitoring unit 34.

In next step S114, the operation monitoring unit 34 determines whether or not the user leaves the editing operation similarly to step S134. Specifically, in a case where the save button 102 or the end button 104 displayed on the screen 36A shown in FIG. 10 is operated by the user, the determination result is positive, and the process proceeds to step S116.

In step S116, the operation monitoring unit 34 determines whether or not the save button 102 is operated by the user similarly to step S136. In a case where the save button 102 is operated, the determination result is positive, and the process proceeds to step S138. Meanwhile, in a case where the end button 104 is operated, the determination result is negative, and the present album creation process is ended.

Meanwhile, in a case where the cancel button 106 displayed on the screen 36A shown in FIG. 10 is operated by the user, the determination result is negative in step S114, and the process proceeds to step S118.

In step S118, the operation monitoring unit 34 determines whether or not the page of the album on which the user performs the editing operation is changed. In a case where the page is not changed, the determination result is negative, and the process returns to step S112. Meanwhile, in a case where the page is changed, the determination result is positive, and the process proceeds to step S120.

In step S120, the operation monitoring unit 34 transmits the operation history information to the leaving prediction unit 28 of the analysis device 16. Specifically, after all the operation history information items regarding the editing operations performed on the page before the page is changed are transmitted to the leaving prediction unit 28, the process proceeds to step S122.

In a case where the operation history information is input to the leaving prediction unit 28 from the operation monitoring unit 34, in the analysis device 16, the determination result is positive in step S204 of the analysis process shown in FIG. 8, and the process proceeds to step S206.

Figures 13, 14:
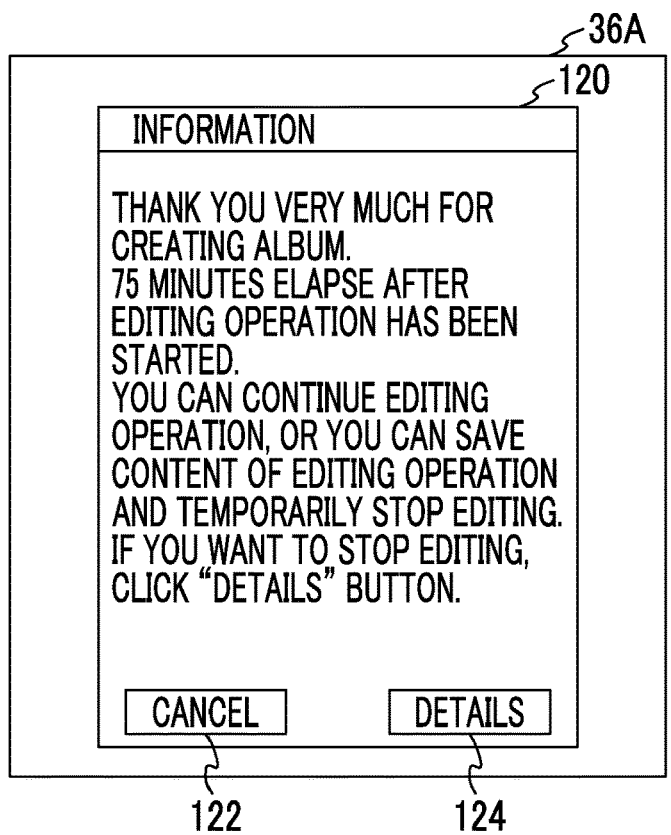
FIG. 13 is a schematic diagram showing an example of an in-operation determination rule used in the leaving prediction unit of the analysis device of the present embodiment.
FIG. 14 is an explanatory diagram for describing a specific example of a message to be displayed on a screen of the display unit in the album creation device of the present embodiment.

In step S206, the leaving prediction unit 28 performs the leaving determination during the editing operation of the user. The leaving prediction unit 28 performs leaving prediction from the determination result. In the present embodiment, the leaving determination during the editing operation of the user is performed by using the definition determined as the in-operation determination rule shown in FIG. 13. In FIG. 13, a case where an example of the in-operation determination rule is defined by an expression is illustrated.

In general, as a time (a period elapsed after the editing operation is started, and hereinafter, referred to as a "total editing time") spent on all the editing operations as described above becomes longer, it tends to increase the possibility of leaving. In a case where the user is used to the editing operation and can smoothly edit the album, an editing speed increases, and thus, a time necessary to perform the editing operation per page becomes shorter. In a case where the editing speed increases as stated above, there is a high possibility that the user is to finish the editing operation and is to order the album. In contrast, in a case where the editing speed decreases, a time necessary to perform the editing operation per page becomes longer. In a case where the editing speed decreases as stated above, since the user may become tired of the editing operation and may feel the editing operation troublesome, there is a high possibility of leaving due to the decline in editing motivation.

Thus, the image analysis information and operation history analysis unit 24 of the analysis device 16 of the present embodiment analyzes the relationship between an editing time and the leaving, and sets the in-operation determination rule created based on the analysis result for the leaving determination rule setting unit 26. In the present embodiment, as a specific example, according to the in-operation determination rule, the degree of possibility that the user is to leave the editing operation is determined by using a total editing time, an editing time necessary to perform the editing operation of the page initially edited by the user and an editing time necessary to perform the editing operation of the page last edited by the user, as shown in FIG. 13. Specifically, the "editing time of the page last edited" in the in-operation determination rule refers to the last page of the album on which the user ends the editing operation until a point of time when the leaving determination is performed by using the in-operation determination rule.

According to the in-operation determination rule shown in FIG. 13, a probability P of the leaving is calculated as the determination result by a logistic regression analysis. The probability P is a value which is equal to or greater than 0 and is equal to or less than 1 ($0 \leq P \leq 1$). As the value becomes closer to 1, and the probability of the leaving becomes higher.

The leaving prediction unit 28 predicts the degree of possibility of leaving from the determination result acquired by applying the operation history information to the in-operation determination rule in this manner. The analysis device 16 of the present embodiment sets a threshold (0.8 as a specific example) for predicting whether or not the possibility of leaving is high for the leaving determination rule setting unit 26. In a case where the probability P is equal to or greater than the threshold (or exceeds the threshold), the leaving prediction unit predicts that the possibility of leaving is to be high.

The threshold and the values of $\beta_0$ to $\beta_2$ in the in-operation determination rule shown in FIG. 13 are values acquired by the image analysis information and operation history analysis unit 24 that analyzes the image analysis information and operation history DB 22.

In a case where the possibility of leaving is determined in this manner, the leaving prediction unit 28 transmits the information indicating the prediction result to the operation monitoring unit 34 of the album creation device 12 in next step S208.

In next step S209, the leaving prediction unit 28 determines whether or not the page on which the user performs the editing operation is the last page. In a case where the page is not the last page, the determination result is negative, and the process returns to the step. The aforementioned process is repeated. Meanwhile, in a case where the page is the last page, the determination result is positive, and the present analysis process is ended.

As described above, since the information indicating the prediction result is transmitted to the album creation device 12 in step S208, the operation monitoring unit 34 determines whether or not the information indicating the prediction result is received in step S121 (see FIGS. 7A and 7B) of the album creation process. In a case where the information indicating the prediction result is not yet received, the determination result is negative, and the process is in a standby state. Meanwhile, in a case where the information indicating the prediction result is received, the determination result is positive, and the process proceeds to step S122.

In step S122, the operation monitoring unit 34 determines whether or not the possibility of leaving is high based on the information indicating the prediction result. In a case where the possibility of leaving is low, the determination result is negative, and the process proceeds to step S112.

Meanwhile, in a case where the possibility of leaving is high, the determination result is positive, and the process proceeds to step S124.

In step S124, the operation monitoring unit 34 displays information indicating that the editing operation is able to be temporarily stopped on the screen 36A of the display unit 36. In the present embodiment, as a specific example, a message 120 is displayed on the screen 36A of the display unit 36 as shown in FIG. 14.

A time elapsed after the user starts the editing operation, which corresponds to the total editing time, a message indicating that the editing operation is able to be continued or the editing operation is temporarily stopped, and a message indicating that the contents of the editing operation are saved in a case where the editing operation is temporarily stopped are included in the message 120 of the specific example shown in FIG. 14.

A cancel button 122 operated by the click of the user in a case where the user selects the continuation of the editing operation or a details button 124 operated by the user in a case where the user selects the stop of the editing operation is displayed on the screen 36A of the specific example shown in FIG. 14.

The reception unit 30 determines whether the user operates the cancel button 122 or the details button 124, and outputs the determination result to the operation monitoring unit 34.

In step S126, the operation monitoring unit 34 determines whether or not the user operates the details button 124. In a case where the cancel button 122 is operated by the user, the determination result is negative, and the process proceeds to step S132. Meanwhile, in a case where the details button 124 is operated by the user, the determination result is positive, and the process proceeds to step S128.

In step S128, the operation monitoring unit 34 displays a detailed description in a case where the editing operation is stopped on the screen 36A of the display unit 36. In the present embodiment, as a specific example, a message (information) 130 is displayed on the screen 36A of the display unit 36, as shown in FIG. 15.

Figure 15:
FIG. 15 is an explanatory diagram for describing a specific example of a message to be displayed on a screen in a case where a details button is selected on the message shown in FIG. 14.

A message indicating that the editing operation is able to be resumed by reading a receipt in a case where the user resumes the editing operation or a message indicating that a predetermined service (discount as a specific example) is received by resuming the editing operation is included in the message 130 of the specific example shown in FIG. 15.

A cancel button 132 operated by the click of the user in a case where the user selects the continuation of the editing operation and a temporary save button 134 operated by the user in a case where the user selects the stop of the editing operation are displayed on the screen 36A of the specific example shown in FIG. 15.

The reception unit 30 determines whether the user operates the cancel button 132 or the temporary save button 134, and outputs the determination result to the operation monitoring unit 34.

In step S130, the operation monitoring unit 34 determines whether or not the user operates the temporary save button 134. In a case where the cancel button 132 is operated by the user, the determination result is negative, and the process proceeds to step S132. Meanwhile, in a case where the temporary save button 134 is operated by the user, the determination result is positive, and the process proceeds to step S138.

In step S138, the operation monitoring unit 34 transmits the image information and the operation history information to be accumulated in the image information and operation history DB 52 to the temporary storage server 14. Specifically, the operation monitoring unit 34 outputs the image information and the operation history information to the image analysis information and operation history output unit 40, and the image analysis information and operation history output unit 40 transmits the image information and the operation history information to the input and output unit 50 of the temporary storage server 14. The input and output unit 50 of the temporary storage server 14 stores the image information and the operation history information in the image information and operation history DB 52.

In next step S140, the operation monitoring unit 34 outputs the receipt to the user by using the display unit 36, and ends the present album creation process. In the present embodiment, information indicating the user ID is printed on the receipt by the display unit 36. An identification number, a one-dimensional barcode, and a two-dimensional barcode are used as a specific example of the information representing the user ID.

In a case where the user orders the album, information capable of being used as a discount coupon applicable to a creation fee for the album is printed on the receipt by the display unit 36. A coupon number, a one-dimensional barcode, and a two-dimensional barcode are used as a specific example of the information capable of being used as the coupon. Although it has been described in the present embodiment that the receipt is printed on paper by the display unit 36, the method of outputting the receipt is not limited to the printing. For example, the receipt may be output on the screen 36A of the display unit 36 by displaying the same contents as the contents printed on the receipt. In this case, for example, the contents displayed on the screen 36A may be captured by the smartphone of the user, and thus, the captured image may be used as the receipt. The coupon is not limited to the discount coupon, and is not particularly limited as long as any service or a so-called privilege is provided to the user.

Meanwhile, in a case where the reception unit 30 determines that the instruction performed by the user through the operation unit 37 indicates that the user resumes the editing operation after leaving the editing operation in step S10, the determination result is positive, and the process proceeds to step S12.

Figure 16:
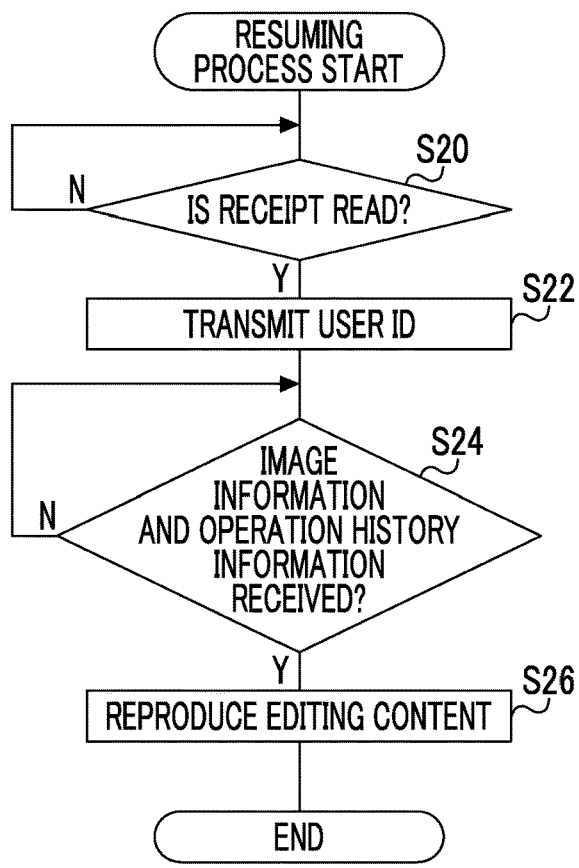
FIG. 16 is a flowchart showing an example of a flow of a resuming process in the album creation process performed by the album creation device of the present embodiment.

In step S12, a resuming process shown in the example of FIG. 16 is performed.

In step S20 shown in FIG. 16, the reception unit 30 determines whether or not the receipt is read. Specifically, the reception unit determines whether or not the information indicating the user ID printed on the receipt and the information capable of being used as the discount coupon are read. In a case where the receipt is not read, the determination result is negative, and the process is in a standby state. Meanwhile, in a case where the receipt is read, the determination result is positive, and the process proceeds to step S22.

In step S22, the reception unit 30 transmits the user ID to the input and output unit 50 of the temporary storage server 14.

In a case where the user ID is input to the input and output unit 50 from the reception unit 30 of the album creation device 12, the information searching process for outputting the image information and the operation history information corresponding to the user ID to the album creation device 12 is performed by the CPU 80 in the temporary storage server 14. Hereinafter, the information searching process performed in the temporary storage server 14 of the present embodiment will be described with reference to FIG. 17.

Figure 17:
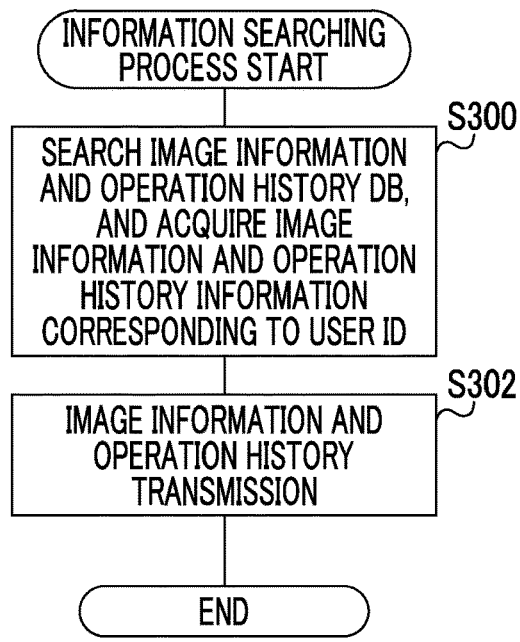
FIG. 17 is a flowchart showing an example of a flow of an information searching process performed by the temporary storage server of the present embodiment.

In step S300 of FIG. 17, the input and output unit 50 searches the image information and operation history DB 52, and acquires the image information and the operation history information corresponding to the received user ID. In next step S302, the input and output unit 50 outputs the acquired image information and operation history information to the reception unit 30 of the album creation device 12, and ends the present information searching process.

As stated above, since the image information and the operation history information are transmitted to the album creation device 12 in step S302, the reception unit 30 determines whether or not the image information and the operation history information are received in step S24 (see FIG. 16) of the resuming process. In a case where the image information and the operation history information are not yet received, the determination result is negative, and the process is in a standby state. Meanwhile, in a case where the image information and the operation history information are received, the determination result is positive, and the process proceeds to step S26.

In step S26, the editing unit 38 reproduces the editing contents based on the received image information and operation history information, and ends the present resuming process. The process proceeds to step S110 of the album creation process. The editing contents are reproduced, and thus, the same display as the display performed immediately before the user leaves the editing operation is performed on the screen 36A of the display unit 36. As stated above, the editing unit 38 reproduces the editing contents, and thus, the user who resumes the editing operation can perform the editing operation subsequently to the editing operation performed immediately before leaving. The editing unit 38 in this case is an example of a reproduction unit of the technology of the present disclosure.

In the image editing system 10 of the present embodiment, in a case where the user resumes the editing operation after leaving, since the degree of possibility of leaving of the user is higher than that in a case where the user creates a new album, the process proceeds to step S110 after the resuming process (see FIG. 16), and the mode is changed to the monitoring mode. However, the step to which the process proceeds after the resuming process is not limited thereto, and for example, the process may proceed to step S132.

As described above, in the image editing system 10 of the present embodiment, the album creation device 12 includes the reception unit 30 that receives the plurality of images from the user and the image analysis unit 32 that analyzes the characteristics of the plurality of images. The analysis device 16 includes the leaving determination rule setting unit 26 and the leaving prediction unit 28. The initial determination rule for determining the degree of possibility that the user is to leave the editing operation of the user using the plurality of images received by the reception unit 30 of the album creation device 12 is set for the leaving determination rule setting unit 26. The leaving prediction unit 28 predicts the degree of possibility of leaving from the determination result acquired by applying the analysis result of the image analysis unit 32 to the initial determination rule.

As stated above, according to the image editing system 10 of the present embodiment, since the degree of possibility of leaving is predicted from the determination result of the initial determination rule, it is possible to prepare a countermeasure corresponding to the prediction result for the user. Thus, it is possible to suppress the leaving of the user, and it is possible to increase the degree of possibility that the user is to resume the editing operation even in a case where the user leaves the editing operation.

Accordingly, in the image editing system 10 of the present embodiment, it is possible to increase a possibility that the user is to finish the editing operation using the plurality of images. Therefore, since the user can order the album, a company under the contract for the creation of the album can increase sales.

In the present embodiment, the mode is changed to the operation monitoring mode only in a case where it is determined that the degree of possibility of leaving is high based on the initial determination rule. Accordingly, in a case where it is determined that the degree of possibility of leaving is low, communication may not be performed between the operation monitoring unit 34 of the album creation device 12 and the leaving prediction unit 28 of the analysis device 16. As mentioned above, according to the image editing system 10 of the present embodiment, it is possible to reduce the communication frequency between the album creation device 12 and the analysis device 16.

Although it has been described in the embodiment that the plurality of mountboards is used as the example of the pages such as an album or a calendar, the number of mountboards is not limited to be plural, and may be one. A postcard or a name card is used as a specific example in a case where the number of mountboards is one.

Although it has been described in the embodiment that the album creation device 12 is installed in the store such as the home electronics retail store or the camera store, the album creation device 12 may be any device, and the installation place thereof is not limited. For example, various mobile terminal devices such as a smartphone and a tablet or a stationary personal computer may be used.

Figures 18, 19:
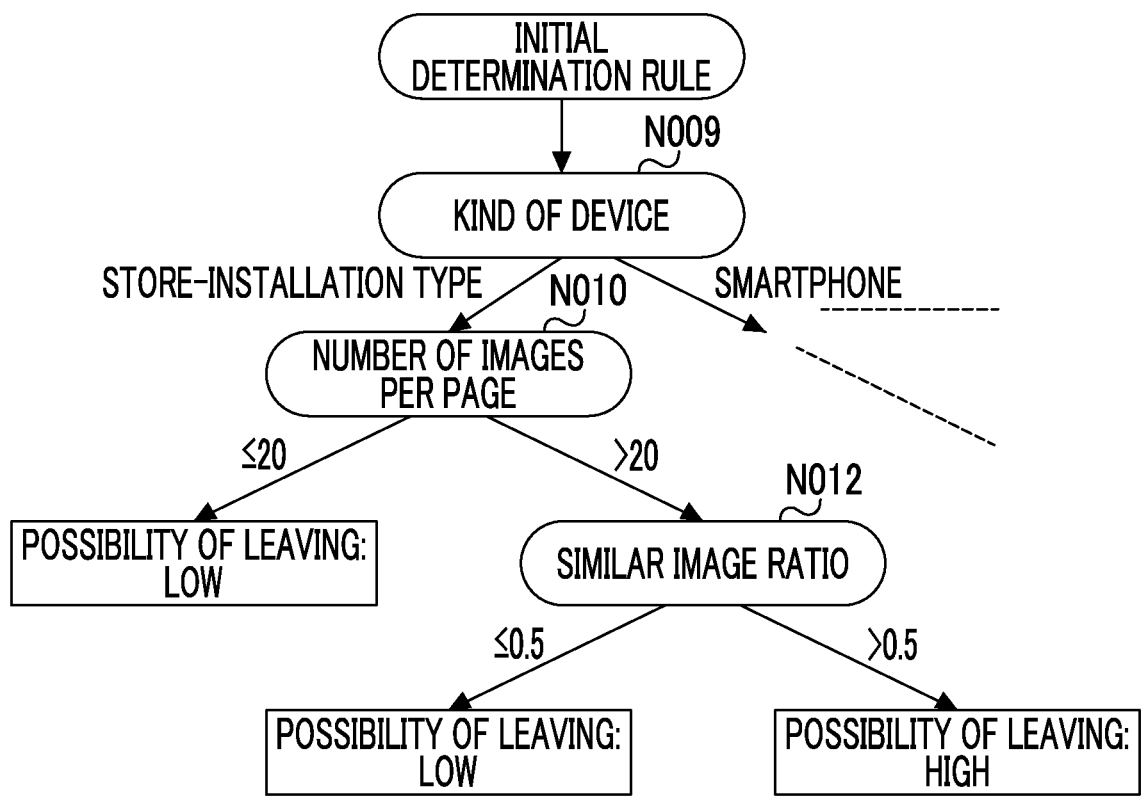
FIG. 18 is a diagram of a determination tree showing another example of the initial determination rule used in the leaving prediction unit of the analysis device of the present embodiment.
FIG. 19 is a schematic diagram showing another example of the in-operation determination rule used in the leaving prediction unit of the analysis device of the present embodiment.

In a case where the album creation device 12 includes multiple kinds of devices in this manner, a leaving rate which is the degree of possibility that the user is to leave the editing operation is different depending on the kinds of the devices. Thus, in a case where multiple kinds of devices are assumed as the album creation devices 12, the kind of the device may be initially determined in node N009 in the initial determination rule, as shown in FIG. 18. In the in-operation determination rule, the in-operation determination rule may be set for each of the kinds of devices. The kind of the device may be initially determined, and the in-operation determination rule corresponding to the determined kind of the device may be used. For example, as shown in FIG. 19, the image analysis information and operation history analysis unit 24 acquires the values of $\beta_{m0}$ to $\beta_{m2}$ for m kinds of devices in the determination rule by analyzing the image analysis information and operation history DB 22, and Expression which corresponds to the m kinds of devices and is represented as Zm in FIG. 19 may be used as the in-operation determination rule.

As shown in FIG. 19, the degree of possibility that the user is to leave the editing operation is determined by using the total editing time, the editing time necessary to perform the editing operation of the page initially edited by the user, and the editing time necessary to perform the editing operation of the page last edited by the user.

Although it has been described in the embodiment that a difference between the editing time necessary to perform the editing operation of the page initially edited by the user and the editing time necessary to perform the editing operation of the page last edited by the user is used in the in-operation determination rule (see FIGS. 13 and 19), a change amount of the editing time may be used, and the present embodiment is not limited thereto. For example, a difference between an average value of the editing time per page necessary to perform the editing operation after the user already ends the editing operation and the editing time necessary to perform the editing operation of the page last edited may be used.

Figure 20A:
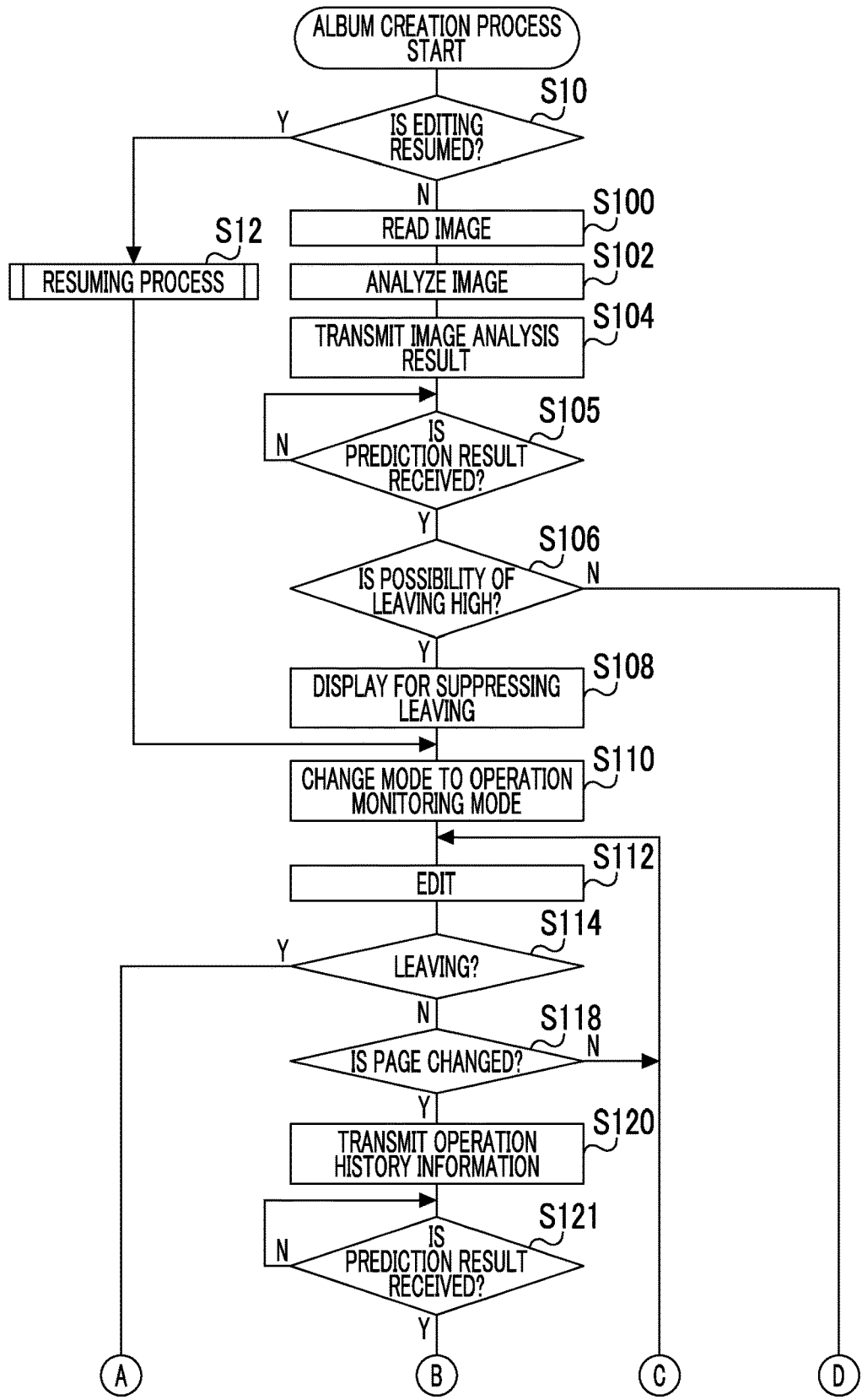
FIGS. 20A and 20B are a flowchart showing another example of the flow of the album creation process performed by the album creation device of the present embodiment.
Figure 20B:
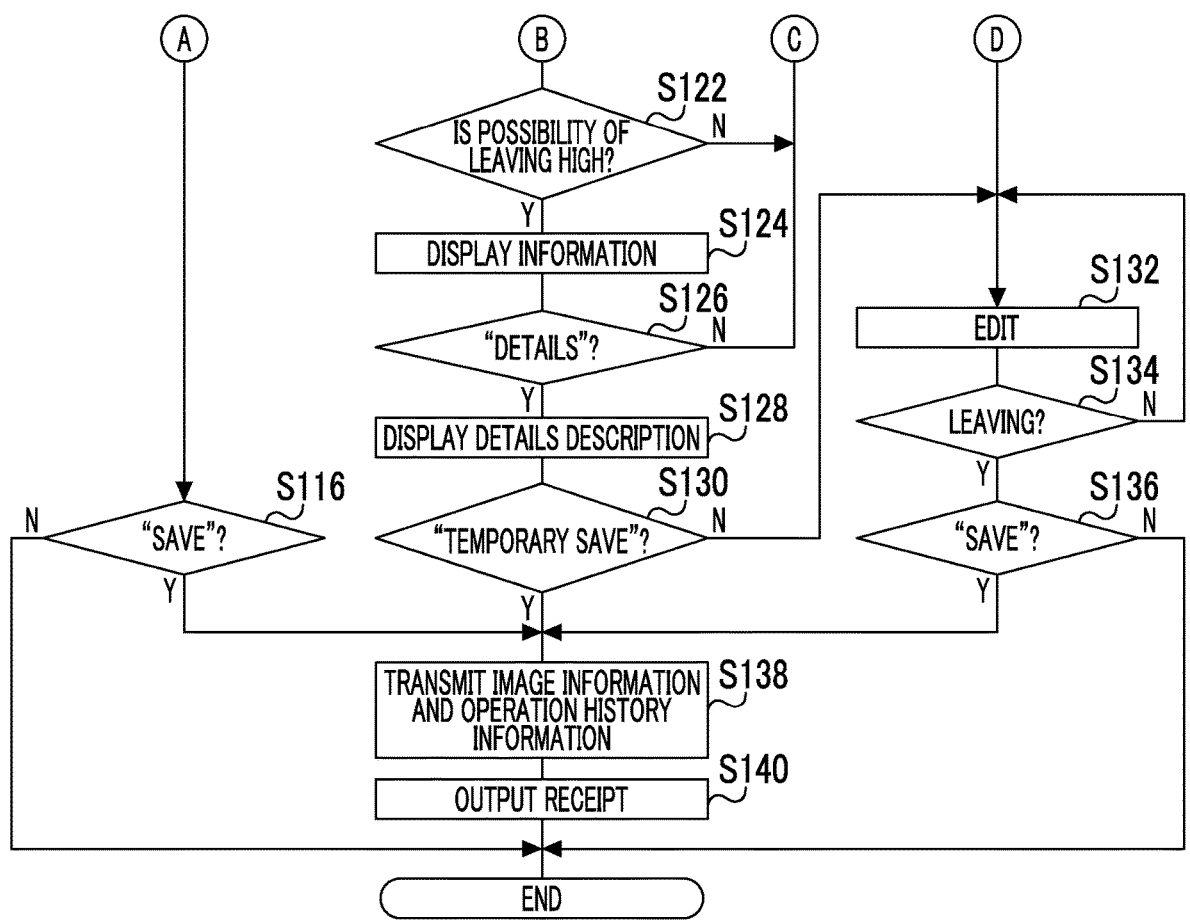

Although it has been described in the embodiment that the process proceeds to step S132 in a case where it is determined that the user does not operate the details button 124 in step S126 of the album creation process (see FIGS. 7A and 7B), the step to which the process proceeds is not limited thereto. For example, the process proceeds to step S112 as shown in FIGS. 20A and 20B, and the operation monitoring mode may be continued. The determination of the degree of possibility of leaving by using the in-operation determination rule and the prediction using the determination result may be repeatedly performed. In this case, a value of the threshold for determining whether or not the possibility of leaving is high may be changed depending on the number of times the determination and the prediction are repeated. In this case, the threshold may be changed depending on the information (for example, the number of unedited pages) regarding unedited pages.

The display of the information (see FIG. 14) performed in step S124 of the album creation process (see FIGS. 7A and 7B) of the embodiment may be performed at not the aforementioned timing but a timing determined depending on the magnitude of the degree of possibility that the user is to leave the editing operation. For example, in a case where the album creation device 12 is installed in the store such as the home electronics retail store or the camera store, the aforementioned information may be displayed at a timing close to the closing time of the store.

In addition, the configurations and the operations of the image editing system 10, the album creation device 12, the temporary storage server 14, and the analysis device 16 described in the embodiment are examples, and may be appropriately changed without departing from the gist of the technology of the present disclosure.

The entire disclosure of Japanese Patent Application No. 2015-196183 filed on Oct. 1, 2015 is incorporated herein into this specification by reference.

All documents, patent applications, and technical standards recited in this specification are incorporated herein by reference in this specification to the same extent as if individual publications, patent applications, and technical standards were specifically and individually indicated to be incorporated by reference.

EXPLANATION OF REFERENCES

10: image editing system
12: album creation device
16: analysis device
26: leaving determination rule setting unit
28: leaving prediction unit
30: reception unit
32: image analysis unit
34: operation monitoring unit
36: display unit
50: input and output unit

What is claimed is:
1. An image editing system comprising:
a processor; and
a memory connected to the processor;
wherein the processor is configured to execute a process including:
receiving a plurality of images;
setting an initial determination rule for determining a degree of possibility that the user is to leave an editing operation of the user using the plurality of images;
analyzing characteristics of the plurality of images; and
predicting the degree of possibility of leaving from a determination result acquired by applying a result of the analyzing to the initial determination rule;
wherein, in a case where the predicted degree of possibility of leaving is greater than a predetermined threshold, providing a determination that a possibility of leaving is high.
2. The image editing system according to claim 1, further comprising:
displaying a predetermined display for suppressing the leaving or for causing the user to perform the editing operation again after the user leaves on a display unit in a case where the predicting determines that the possibility of leaving is high.
3. The image editing system according to claim 2,
wherein the displaying performs the predetermined display in at least one of a time before the editing operation is started or a time within a predetermined time after the editing operation is started.

4. The image editing system according to claim 1, further comprising:

monitoring the editing operation of the user in a case where the predicting determines that the possibility of leaving is high, wherein the predicting predicts the degree of possibility of leaving from a determination result acquired by applying a monitoring result to an in-operation determination rule for determining the degree of possibility of leaving during the editing operation based on past data.

5. The image editing system according to claim 4, wherein the in-operation determination rule is set based on a time elapsed after the user starts the editing operation and a change amount of an editing time when the user performs the editing operation on mountboards to which the plurality of images is assigned and on which the editing operation is performed.

6. The image editing system according to claim 5, wherein the information regarding the editing operations is at least one of a ratio of the number of a plurality of similar images to the number of the plurality of images, the number of the plurality of images, or the number of mountboards to which the plurality of images is assigned and on which the editing operation is performed.

7. The image editing system according to claim 1, wherein the initial determination rule is set for the setting unit based on a relationship between information regarding editing operations performed by a plurality of users and information indicating whether or not the users leave the editing operations.

8. The image editing system according to claim 1, further comprising:

saving a content of the editing operation before the user leaves the editing operation in a case where the user leaves the editing operation, and reproducing the saved content of the editing operation in a case where an instruction to resume the editing operation is received after the user leaves.

9. The image editing system according to claim 1, further comprising:

providing information indicating the user is able to receive a predetermined service by resuming the editing operation after the user leaves to the user in a case where the user leaves the editing operation.

10. An image editing device comprising:

a processor; and a memory connected to the processor;

wherein the processor is configured to execute a process including:

receiving a plurality of images from a user;

analyzing characteristics of the plurality of images; and predicting a degree of possibility of leaving that the user is to leave the editing operation of the user using the received plurality of images from a determination result acquired by applying an analysis result of the analyzing to an initial determination rule for determining the degree of possibility of leaving, displaying a predetermined display for suppressing the leaving or for causing the user to perform the editing operation again after the user leaves on a display unit in a case where a predicting of an analysis device determines that the possibility of leaving is high, and providing a determination that the possibility of leaving is high in a case where the predicted degree of possibility of leaving is greater than a predetermined threshold.

11. An image editing method comprising:

receiving a plurality of images from a user;

setting an initial determination rule for determining a degree of possibility that the user is to leave an editing operation of the user using the plurality of received images;

analyzing characteristics of the plurality of images; and predicting the degree of possibility of leaving from a determination result acquired by applying a result of the analysis to the initial determination rule;

wherein, in a case where the predicted degree of possibility of leaving is greater than a predetermined threshold, providing a determination that a possibility of leaving is high.

12. A non-transitory computer readable medium storing a program that causes a computer to execute a process for an image editing, the process comprising:

receiving a plurality of images from a user;

setting an initial determination rule for determining a degree of possibility that the user is to leave an editing operation of the user using the plurality of received images;

analyzing characteristics of the plurality of images; and predicting the degree of possibility of leaving from a determination result acquired by applying a result of the analysis to the initial determination rule;

wherein, in a case where the predicted degree of possibility of leaving is greater than a predetermined threshold, providing a determination that a possibility of leaving is high.

* * * * *